(12) United States Patent
Wang et al.

(10) Patent No.: US 11,633,813 B2
(45) Date of Patent: Apr. 25, 2023

(54) REAL-TIME WELD QUALITY ANALYSIS SYSTEMS AND METHODS

(71) Applicant: GM GLOBAL TECHNOLOGY OPERATIONS LLC, Detroit, MI (US)

(72) Inventors: Pei-chung Wang, Troy, MI (US); Spyros P. Mellas, Waterford, MI (US); Debejyo Chakraborty, Novi, MI (US); James Michael Ward, Almont, MI (US); Diana M. Wegner, Bloomfield Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 663 days.

(21) Appl. No.: 16/692,430

(22) Filed: Nov. 22, 2019

(65) Prior Publication Data

US 2021/0154773 A1    May 27, 2021

(51) Int. Cl.
*B23K 31/12* (2006.01)
*B25J 15/00* (2006.01)
(Continued)

(52) U.S. Cl.
CPC .......... *B23K 31/125* (2013.01); *B23K 9/0953* (2013.01); *B23K 9/0956* (2013.01);
(Continued)

(58) Field of Classification Search
CPC .. B23K 31/125; B23K 9/0953; B23K 9/0956; B23K 9/126; B23K 9/127; B23K 9/164; B25J 15/0066
See application file for complete search history.

(56) References Cited

U.S. PATENT DOCUMENTS 8,063,340 B2    11/2011  Hu et al.
8,129,652 B2 *   3/2012  Hampton ............. B23K 9/0956
                                                  219/137.2
(Continued)

FOREIGN PATENT DOCUMENTS

CN    104084669 A  * 10/2014 ............. B23K 9/028
CN    106093070 A    11/2016
(Continued)

OTHER PUBLICATIONS

Machine translation of KR-102235832: Lee Hwe Joon, Portable type welding inspection appatatus and inspection method, 2019 (Year: 2019).*

(Continued)

*Primary Examiner* — Brian W Jennison
*Assistant Examiner* — Abigail H Rhue (57) ABSTRACT

A weld system includes: a robot control module configured to actuate a robot and move a welder along a joint of metal workpieces during welding, the welder being attached to the robot; a weld control module configured to, during the welding, apply power to the welder, supply a shield gas, and supply electrode material; a vision sensor configured to, during the welding, optically measure distances between the vision sensor and locations, respectively, on an outer surface of a weld bead created along the joint by the welder; and a weld module configured to: determine a strength of the weld bead at a location based on: the distances at the location along the joint; and at least one parameter from at least one of the robot control module during the welding, the weld control module during the welding, and a sensor configured to capture data of the welding during the welding.

20 Claims, 9 Drawing Sheets

(51) Int. Cl.
*B23K 9/095* (2006.01)
*B23K 9/16* (2006.01)
*B23K 9/12* (2006.01)
*B23K 9/127* (2006.01)

(52) U.S. Cl.
CPC ............ *B23K 9/126* (2013.01); *B23K 9/127* (2013.01); *B23K 9/164* (2013.01); *B25J 15/0066* (2013.01)

(56) References Cited

U.S. PATENT DOCUMENTS

| | | | |
|---|---|---|---|
| 8,158,905 B2 | 4/2012 | Khakhalev et al. | |
| 8,853,593 B2 | 10/2014 | Hampton | |
| 9,776,272 B2* | 10/2017 | Einav | B23K 9/02 |
| 11,267,066 B2* | 3/2022 | Albright | B23K 9/16 |
| 2012/0048838 A1* | 3/2012 | Ishida | B23K 26/032 |
| | | | 219/121.83 |
| 2014/0138366 A1 | 5/2014 | Zhang et al. | |
| 2014/0197148 A1* | 7/2014 | Chen | B23K 35/365 |
| | | | 428/650 |
| 2018/0130226 A1* | 5/2018 | Meess | G06K 9/6215 |

FOREIGN PATENT DOCUMENTS

| | | |
|---|---|---|
| CN | 205817123 U | 12/2016 |
| KR | 102235832 B1 * | 5/2019 |

OTHER PUBLICATIONS

Abell, Jeffrey A., et al. "Big Data Driven Manufacturing—Processing-Monitoring-for-Quality Philosophy;" Journal of Manufacturing Science and Engineering; Oct. 2017.

U.S. Appl. No. 16/525,738, filed Jul. 30, 2019, McGovern et al..

Office Action dated Jun. 20, 2022 corresponding to Chinese Patent Application No. 202011309983.9, 9 pages.

* cited by examiner

REAL-TIME WELD QUALITY ANALYSIS SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to welding and more particularly to systems and methods for performing real-time inspection of welds.

Welding is a process that joins two or more pieces of material together, such as two pieces of metal. Welding involves use of heat to melt or plasticize material and allowing the material to cool to cause the pieces to fuse or bond together.

Different types of heat sources can be used for different types of welding. For example, electricity is used in arc welding. One type of welding is resistance welding. Another type of welding is laser welding where one or more lasers are used to perform laser welding. Other types of welding include, but are not limited to, electron beam welding, friction welding, and ultrasound welding.

Resistance welding involves the generation of heat by passing current through the resistance caused by the contact between two or more metal surfaces. Small pools of molten metal are formed at the weld area as high current (e.g., 1000-100,000 Amps) is passed through the metal.

Spot welding (or resistance spot welding (RSW)) is a resistance welding method used to join overlapping metal components (e.g., sheets). Two electrodes simultaneously pass current through the sheets to weld the components together. The locations where current is passed through the components and the components are joined together can be referred to as spot welds.

SUMMARY

In a feature, a weld system includes: a robot control module configured to actuate a robot and move a welder along a joint of metal workpieces during welding, the welder being attached to the robot; a weld control module configured to, during the welding, apply power to the welder, supply a shield gas to the welder, and supply electrode material to the welder; a vision sensor configured to, during the welding, optically measure N distances between the vision sensor and N locations, respectively, on an outer surface of a weld bead created along the joint by the welder, where N is an integer greater than two; and a weld module configured to: determine a strength of the weld bead at a location along the joint based on: the N distances at the location along the joint; and at least one parameter from at least one of (a) the robot control module during the welding, (b) the weld control module during the welding, and (c) a sensor configured to capture data of the welding during the welding; and store the strength of the weld and the location in memory.

In further features, the weld module is configured to determine the strength of the weld bead at the location along the joint based on: the N distances at the location along the joint; and a voltage applied to the welder during the welding and received from the weld control module.

In further features, the weld module is configured to determine the strength of the weld bead at the location along the joint based on: the N distances at the location along the joint; and a current through the welder during the welding and received from the weld control module.

In further features, the weld module is configured to determine the strength of the weld bead at the location along the joint based on: the N distances at the location along the joint; and a feed rate of the electrode material to the welder during the welding and received from the weld control module.

In further features, the weld module is configured to determine the strength of the weld bead at the location along the joint based on: the N distances at the location along the joint; and a current of an electric motor configured to feed the electrode material to the welder during the welding and received from the weld control module.

In further features, the weld module is configured to determine the strength of the weld bead at the location along the joint based on: the N distances at the location along the joint; and a flow rate of the shield gas to the welder during the welding and received from the weld control module.

In further features, the weld module is configured to determine the strength of the weld bead at the location along the joint based on: the N distances at the location along the joint; and a position of the welder during the welding and received from the robot control module.

In further features, the weld module is configured to determine the strength of the weld bead at the location along the joint based on: the N distances at the location along the joint; and a bearing of the welder during the welding and received from the robot control module.

In further features, the weld module is configured to determine the strength of the weld bead at the location along the joint based on: the N distances at the location along the joint; and a direction of travel of the welder during the welding and received from the robot control module.

In further features, the weld module is configured to determine the strength of the weld bead at the location along the joint based on: the N distances at the location along the joint; and a speed of movement of the welder during the welding and received from the robot control module.

In further features, the weld module is configured to determine the strength of the weld bead at the location along the joint based on: the N distances at the location along the joint; and sound captured by a microphone during the welding.

In further features, the weld module is configured to determine the strength of the weld bead at the location along the joint based on: the N distances at the location along the joint; and at least one image captured by a camera during the welding.

In further features, the N locations are perpendicular to the joint.

In further features, the weld system further includes the robot.

In further features, the vision sensor includes a laser distance sensor.

In further features, the vision sensor is attached to follow behind the welder as the welder is moved along the joint during the welding.

In further features, the weld module is configured to determine the strength of the weld bead at a location along the joint based on: the N distances at the location along the joint; and at least two parameters from at least one of (a) the robot control module during the welding, (b) the weld control module during the welding, and (c) the sensor configured to capture data of the welding during the welding.

In further features, the weld module is configured to determine at least one other characteristic at the location along the joint based on: the N distances at the location along the joint; and at least one parameter from at least one of (a) the robot control module during the welding, (b) the weld control module during the welding, and (c) the sensor configured to capture data of the welding during the welding.

In further features, the at least one other characteristic includes at least one of: a porosity of the weld bead at the location; whether weld cut through occurred at the location; whether joining occurred at the location; whether the weld bead at the location includes insufficient material; and whether the weld bead at the location includes excess material.

In a feature, a method includes: by a robot control module, actuating a robot and moving a welder along a joint of metal workpieces during welding, the welder being attached to the robot; by a weld control module, during the welding, applying power to the welder, supplying a shield gas to the welder, and supplying electrode material to the welder; by a vision sensor, during the welding, optically measuring N distances between the vision sensor and N locations, respectively, on an outer surface of a weld bead created along the joint by the welder, where N is an integer greater than two; determining a strength of the weld bead at a location along the joint based on: the N distances at the location along the joint; and at least one parameter from at least one of (a) the robot control module, (b) a weld control module configured to during the welding, and (c) a sensor configured to capture data of the welding during the welding; and storing the strength of the weld and the location in memory.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Destructive analysis can be used to check the integrity of arc welds.

However, destructive analysis is time consuming. Destructive analysis also destroys parts. Non-destructive techniques include surface altering methods such as liquid dye penetrant, which is undesirable since the surface should not be altered prior to painting. Cracks at welds may interfere with later processing of the joined components, such as painting. Cracks may also decrease mechanical integrity of a joint. Cracks are stress concentrators that can cause joints to prematurely fail in the presence of an applied load. Further, cracks can accelerate the effects of corrosion and lead to corrosion-related failure of the joint.

The present application involves use of a vision (e.g., laser) sensor to non-destructively analyze a weld bead formed via arc welding. A weld module determines one or more characteristics of a weld at a location based on a profile/topography of the weld bead at that location measured by the vision sensor and one or more other welding parameters. Examples of the other welding parameters include, for example, a voltage applied during the arc welding, a current through an electrode during the arc welding, a feed rate of the electrode during the arc welding, a current of an electric motor of an electrode feeder during the arc welding, a flow rate of a shield gas during the arc welding, a position of a weld gun during the arc welding, a bearing of the weld gun during the arc welding, a direction of travel of the weld gun during the arc welding, a speed of movement of the weld gun during the arc welding, sound captured during the arc welding, and an image captured by a camera during the arc welding. Examples of characteristics include, for example, a porosity of the weld bead at the location, whether cut through occurred at the location, whether joining occurred at the location, whether the weld bead at the location includes insufficient material; and whether the weld bead at the location includes excess material.

Figure 1:
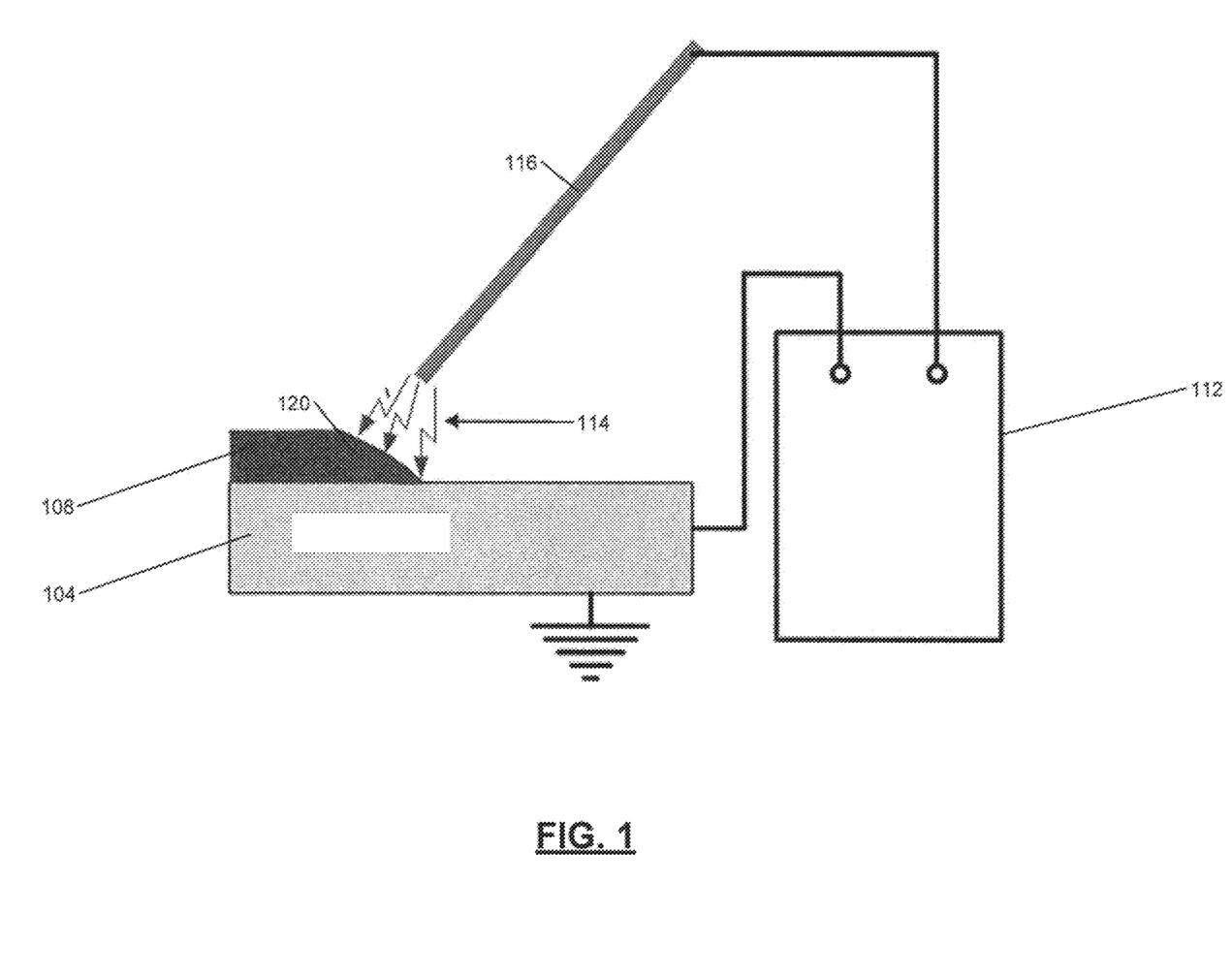
FIG. 1 is a functional block diagram of an example metal arc welding system.

FIG. 1 is a functional block diagram of an example metal arc welding system. Arc welding involves welding two or more workpieces together, such as workpieces 104 and 108. The workpieces 104 and 108 may be metal workpieces or another suitable type of material.

Power is supplied by a power supply 112 to create an arc 114 between an electrode 116 and the workpieces 104 and 108. Heating from the arc 114 melts the (metal) electrode 116, and molten metal 120 from the electrode 116 pools at the joint of the workpieces 104 and 108. The electrode 116 is moved along the joint of the workpieces 104 and 108 to create a weld bead. Once cooled, the metal 120 joins the workpieces 104 and 108 together. While the example of a lap joint is provided, the present application is also applicable to butt joints, T-joints, and other types of joints.

Figure 2:
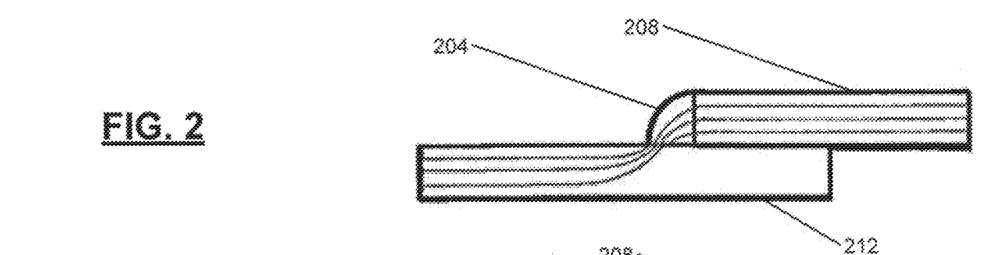
FIGS. 2-4 illustrate cross sectional illustrations of welds at lap joints of two workpieces.
Figure 3:
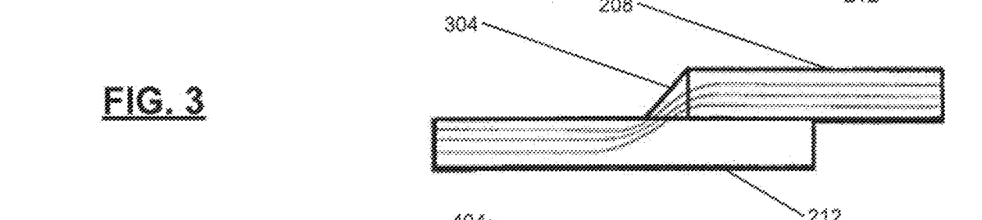
Figure 4:
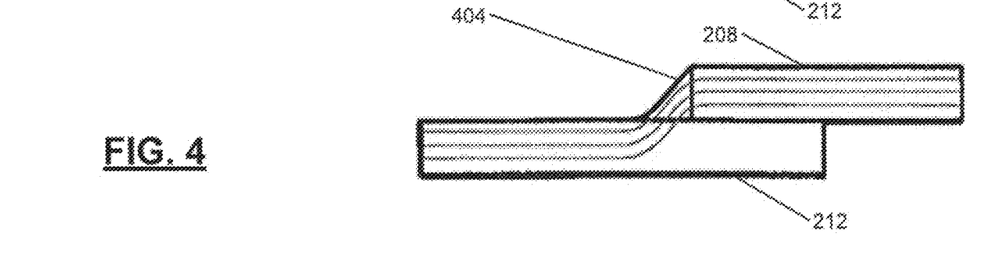

Different weld profiles (and cross-sections), however, provide different stress distributions. FIGS. 2-4 illustrate cross sectional illustrations of welds at lap joints of two workpieces 208 and 212. FIG. 2 provides a first stress distribution through a first weld 204. FIG. 3 provides a second stress distribution through a second weld 304. The second stress distribution across the weld is more even (and therefore better) than the first stress distribution. FIG. 4 provides a third stress distribution through a third weld 404. The third stress distribution across the weld is more even (and therefore better) than the second stress distribution. The strength of the third weld 404 is therefore greater than the strength of the second weld 304, and the strength of the second weld 304 is greater than the strength of the first weld 204.

The present application involves optically measuring the profile of a weld bead as welding of workpieces is performed. Based on the profile and one or more other parameters, strengths of the weld at locations along the weld bead are determined, such as in quasi real-time. Locations along the weld bead can be identified based on the strengths at the locations. For example, the weld at a location can be identified as insufficient when the strength of the weld at that location (determined based on the profile of the weld at that location and one or more process parameters at that location) is less than a predetermined strength.

Figure 5:
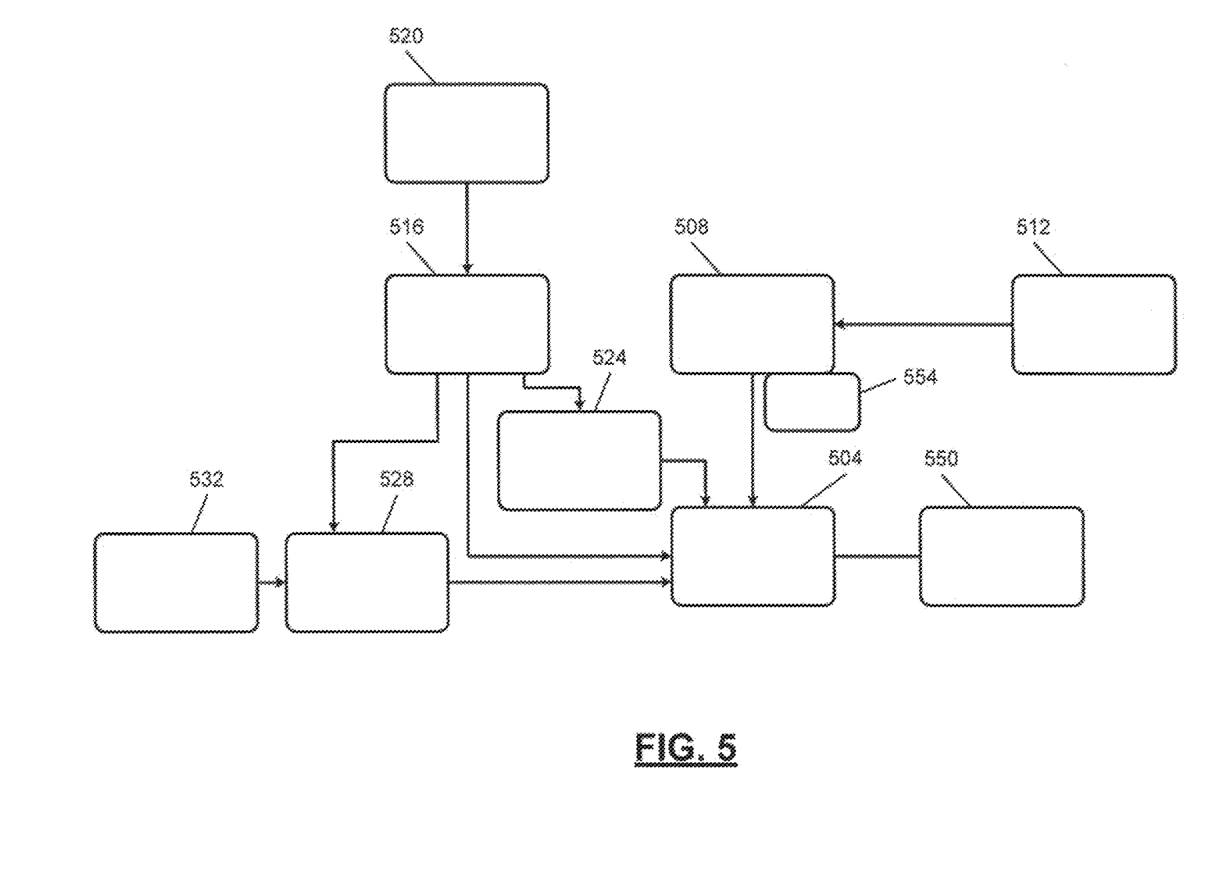
FIG. 5 is a functional block diagram of an example arc welding system.

FIG. 5 is a functional block diagram of an example arc welding system. A (gas metal) weld gun 504 is attached to a robot 508. Weld guns can also be referred to as arc welders. The robot 508 moves the weld gun 504 along a joint of workpieces to weld the workpieces together at the joint via the weld gun 504. A robot control module 512 controls movement of the robot 508. For example, the robot control module 512 may control the robot 508 to achieve a target position (and orientation) of the weld gun 504, a target bearing of the weld gun 504, a target direction of travel of the weld gun 504, and a target speed of movement of the weld gun 504.

A weld control module 516 controls process parameters during welding. For example, the weld control module 516 controls power supplied to the electrode of the weld gun 504 from a power supply 520. For example, the weld control module 516 may control voltage applied to the electrode and current through the electrode. The weld control module 516 also controls feeding of the electrode (material) to the weld gun 504 via an electrode feeder 524, such as including a spool of electrode material. For example, the weld control module 516 may control a feed rate of electrode to the weld gun 504 by the electrode feeder 524 and a current of a motor of the electrode feeder 524 that feeds the electrode to the weld gun 504. The weld control module 516 may also control a flow rate of shield gas to/through the weld gun 504. For example, the weld control module 516 may control opening of a valve 528 to control the flow rate of shield gas to/through the weld gun 504 from a shield gas source 532.

A vision sensor 550 is attached to the robot 508 or the weld gun 504 and moves with the weld gun 504. The vision sensor 550 is located and configured to measure the profile of the weld produced by the weld gun 504 after the weld bead is produced by the weld gun 504 along the joint. The vision sensor 550 measures the profile at a predetermined rate, such as each time the weld gun 504 has moved a predetermined distance along the joint or each predetermined period while the weld gun 504 is moving.

One or more other sensors 554 may also be included. For example, the other sensors 554 may include an acoustic sensor (e.g., a microphone), a (e.g., high-speed0 video camera, thermography, three-dimensional (3D) optic camera, and/or one or more other types of sensors. The one or more other sensors may be coupled to the robot 508 or the weld gun 504 and are configured to capture parameters during welding.

Figure 6:
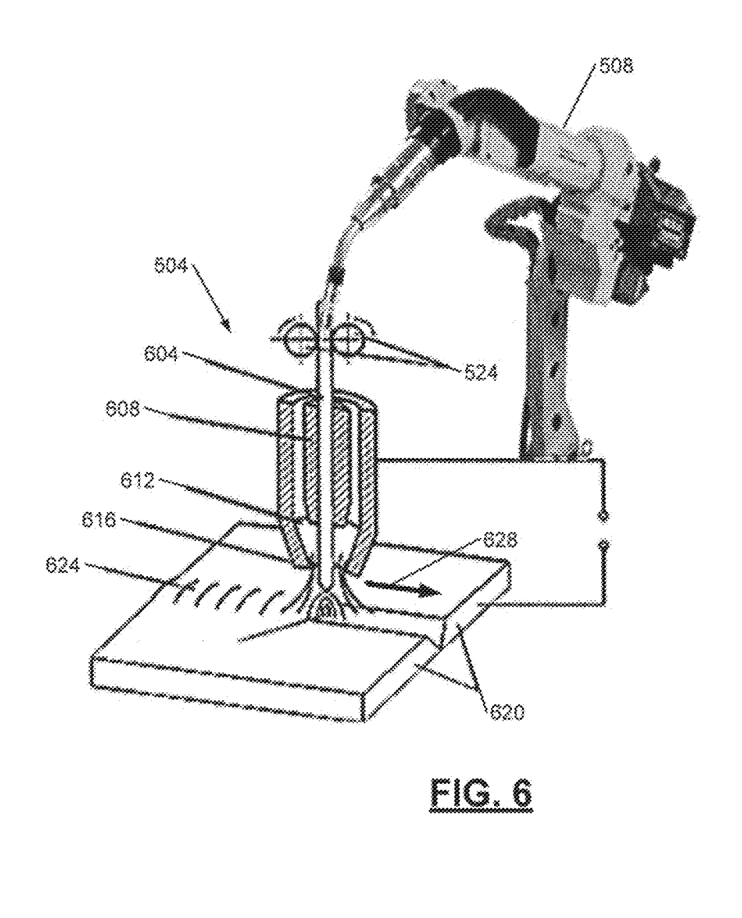
FIG. 6 is a perspective view of an example welding system using an example weld gun.

FIG. 6 is a perspective view of a welding system using an example of the weld gun 504. Electrode 604 is shown in FIG. 6 and is fed through contact nozzle 608. The shield gas flows into cavity 612 and out through nozzle 616. The electrode 604 also extends through the nozzle 616. 620 illustrates example workpieces that are being butt joined via arc welding. 624 illustrates the weld seam. Arrow 628 illustrates the direction that the robot 508 is moving the weld gun 504 to weld the workpieces 620 along the butt joint.

Figure 7:
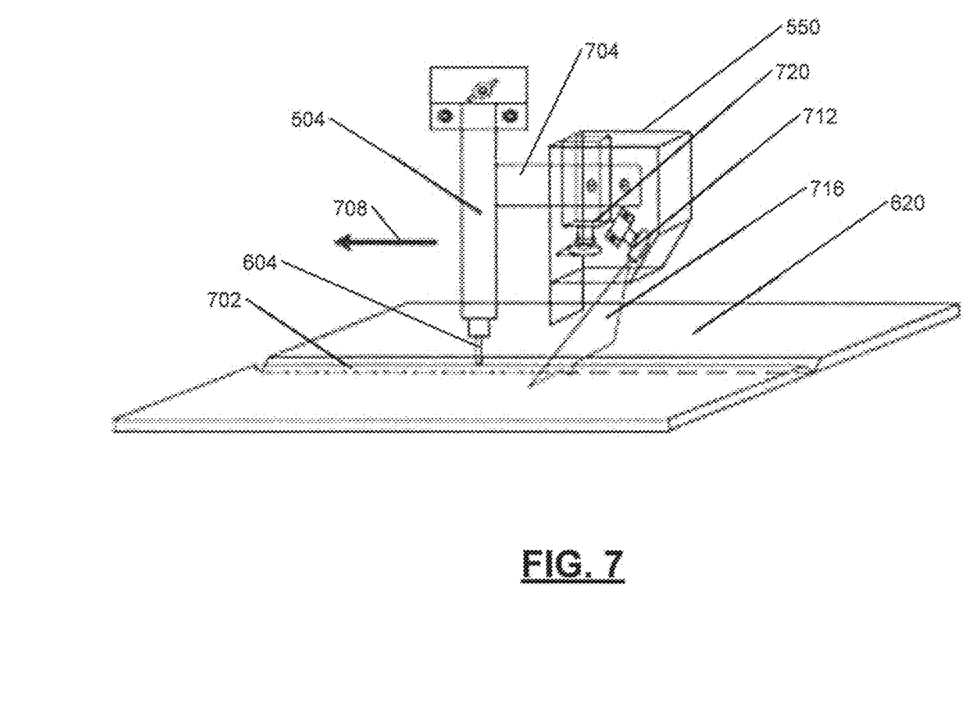
FIG. 7 is a perspective view of an example welding system using an example weld gun.

FIG. 7 is a perspective view of an example welding system using an example of the weld gun 504. FIG. 7 also includes an example of the vision sensor 550. 702 illustrates a joint. As described above, the vision sensor 550 may be mounted to the weld gun 504, such as via a bracket 704. The vision sensor 550 is arranged to optically measure the profile of the weld bead created by the weld gun 504. As such, the vision sensor 550 travels behind the weld gun 504 in the direction of travel. Arrow 708 illustrates the direction of travel in FIG. 7.

The vision sensor 550 includes a light source 712 configured to output light 716 onto the weld bead created by the weld gun 504. The light source 712 may include, for example, one or more lasers, one or more light emitting diodes, or another suitable type of light source. The light source 712 is configured to output light (e.g., only) along a plane that is perpendicular to the weld bead created by the weld gun 504 (e.g., perpendicular to the direction of travel of the weld gun 504).

A light receiver 720 receives light reflected to the light receiver 720 from the light source 712 by the weld bead at various locations on the weld bead. The output of the light receiver 720 includes a topographical profile of the weld bead at the locations across (perpendicular to) the weld bead.

Figure 8:
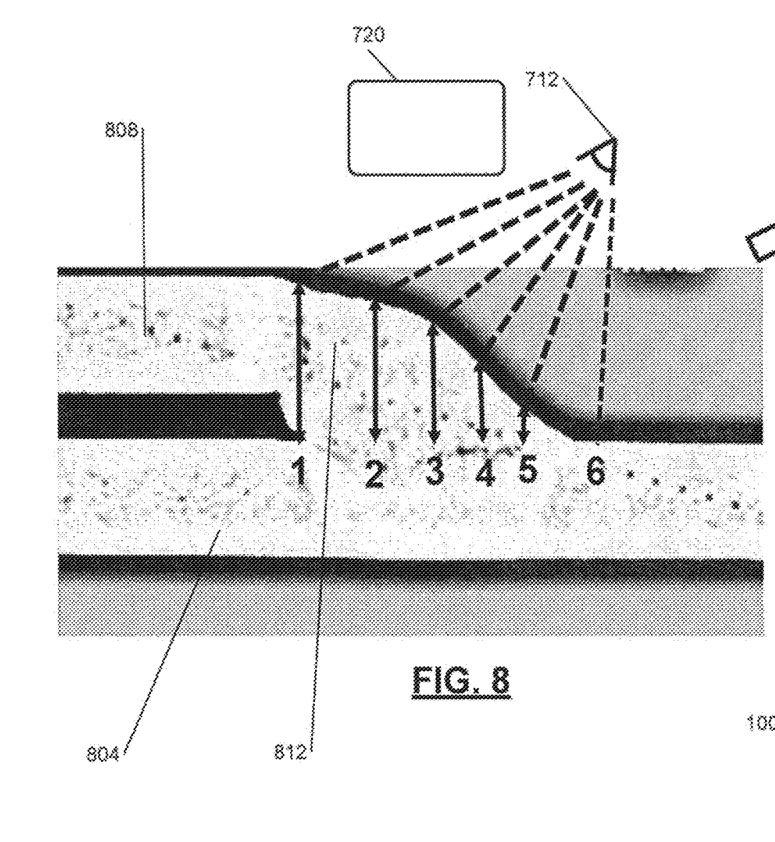
FIG. 8 includes a cross-sectional view of workpieces welded together via a weld bead and a topographical profile of the weld bead captured over time by a vision sensor.

FIG. 8 includes a cross-sectional view of workpieces 804 and 808 welded together via a weld bead 812 and distances that can be used to create a topographical profile of the weld bead 812 captured over time by the vision sensor 550.

As stated above, the light receiver 720 receives light from at various locations across (perpendicular to) the weld bead. Examples of locations are illustrated by 1, 2, 3, 4, 5, and 6 in FIG. 8. While the example of 6 locations is provided, the light receiver 720 may be configured to receive light from N locations across the weld bead, where N is an integer greater than or equal to 3. The light received from a location is indicative of a distance between the weld bead at that location and the light receiver 720. The distances at the locations can be used to create topographies of the weld bead at the locations, respectively.

Figures 9, 10:
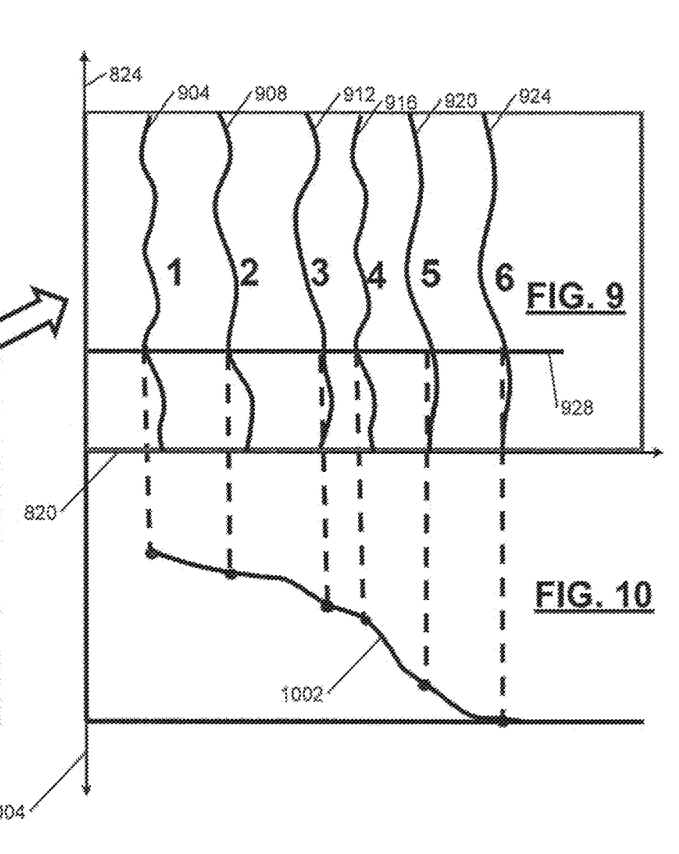
FIG. 9 includes an example graph of distance versus time as a weld bead is created.
FIG. 10 includes an example illustration of topography of a weld bead at a time as a function of increasing distance.

As the weld bead is created and the vision sensor 550 scans the weld bead, traces of the distances at the locations, respectively, are generated by the light receiver 720. FIG. 9 includes an example graph of distance 820 versus time 824 as a weld bead is created.

Trace 904 corresponds to the distance at the first location of the weld bead over time (i.e., at different locations along the weld bead). Trace 908 corresponds to the distance at the second location of the weld bead over time. Trace 912 corresponds to the distance at the third location of the weld bead over time. Trace 916 corresponds to the distance at the fourth location of the weld bead over time. Trace 920 corresponds to the distance at the fifth location of the weld bead over time. Trace 924 corresponds to the distance at the sixth location of the weld bead over time. A set of the distances at a given time are indicative of the topography of the weld bead at that time/location. For example, the distances (of the traces 904-924) at time 928 correspond to the topography of the weld bead at the location/time 928. FIG.

10 includes an example illustration of topography 1002 of a weld bead at the time 928, as a function of increasing distance 1004.

Figure 11:
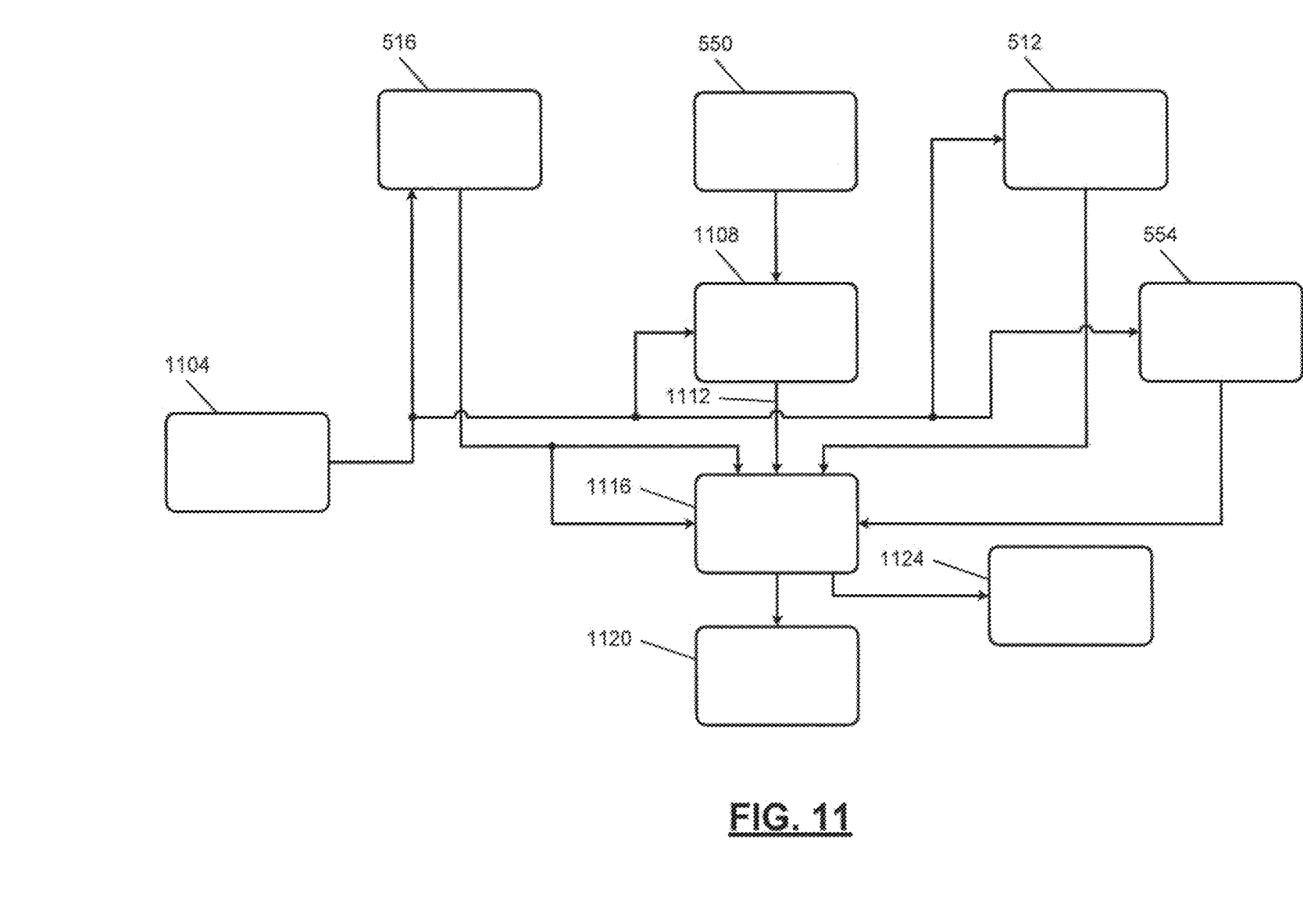
FIG. 11 includes a functional block diagram of an example implementation of a weld characteristic determination system.

FIG. 11 includes a functional block diagram of an example implementation of a weld characteristic determination system. A triggering module 1104 selectively generates a trigger signal during welding, such as each predetermined period during welding or each time the weld gun 504 has moved a predetermined distance during welding. The predetermined period may be calibratable and may be, for example, 1 second or another suitable period. The predetermined distance may be calibratable and may be, for example, 0.5 millimeters or another suitable distance.

Each time that the trigger signal is generated, the weld control module 516 outputs a set of present welding parameters and the robot control module 512 outputs a set of present robot parameters. The present welding parameters may include, for example, a present current provided to the weld gun 504, a present voltage applied to the weld gun 504, a present current of a motor of the electrode feeder 524, a present feed rate of the electrode to the weld gun 504, and a flow rate of the shield gas to the weld gun 504. The present robot parameters may include, for example, a present weld gun position (e.g., in a coordinate system of the workpieces being joined), a present bearing of the weld gun 504, a present direction of movement of the weld gun 504, and a present speed of movement of the weld gun 504.

Each time that the trigger signal is generated, a topography module 1108 generates a topography 1112 of the weld bead at a location based on the present distances at the respective locations on the weld bead measured by the light receiver of the vision sensor 550. The topography 1112 includes the distances at the respective locations. The topography 1112 may include, for example, an equation (e.g., a polynomial equation) indicative of the profile of the outer surface of the weld bead at the location. The topography module 1108 may determine the equation, for example, using a curve fitting algorithm and the distances measured by the light receiver.

Each time that the trigger signal is generated, the sensors 554 output present external parameters. The present external parameters may include, for example, a present sound near the weld gun 504, a present image captured using a (e.g., high-speed) video camera, and/or other parameters.

Each time that the trigger signal is generated, a weld module 1116 determines one or more characteristics (output(s)) of the weld bead at a location based on the topography 1112 and at least one other parameter (inputs), such as at least one of: at least one of the present welding parameters; at least one of the present robot parameters; and at least one of the outputs of the sensors 554. Examples of the characteristics include at least one of: whether a defect in the weld bead is present at the location, a length of a detect in the weld bead, a strength of the weld bead at the location, a porosity of the weld bead at the location, whether a cut through occurred at the location, whether the workpieces to be welded are joined at the location, whether the weld bead at the location includes insufficient weld material from the electrode, and whether the weld bead at the location includes excess weld material from the electrode.

Figure 12:
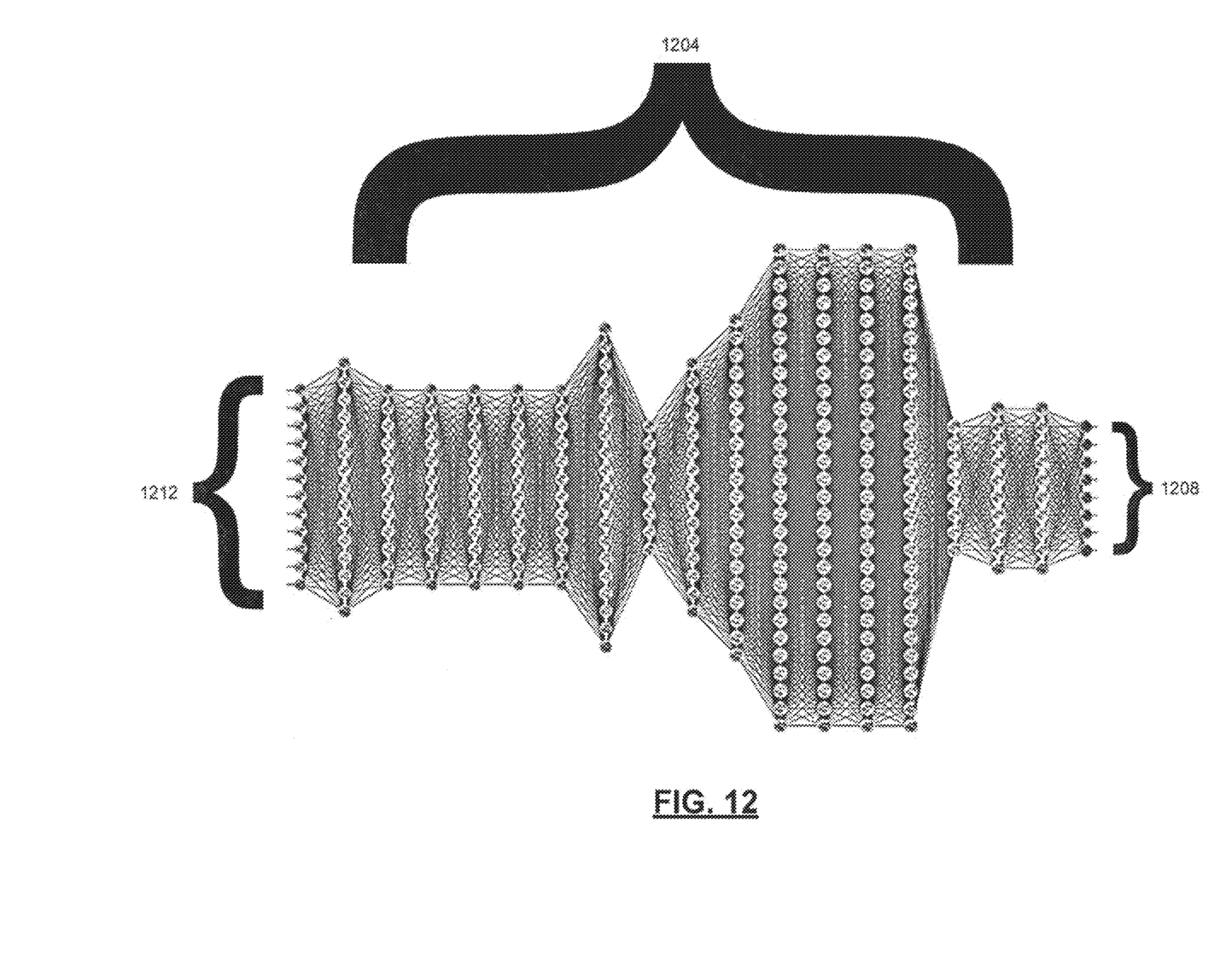
FIG. 12 includes an example illustration of a model that generates the characteristics of a weld at a location based on inputs.

The weld module 1116 may determine, for example, using a model trained to generate the characteristics given the inputs. The model may include, for example, a convolutional neural network, an artificial neural network, model generated using genetic programming or another suitable type of model. FIG. 12 includes an example illustration of a model 1204 that generates the characteristics (outputs) 1208 regarding the weld at the location based on the inputs 1212 discussed above.

For example, the weld module 1116 may determine the strength of the weld bead at the location along the joint based on the distances (of the topography 1112) and the voltage applied. The weld module 1116 may determine the strength using one of an equation and a lookup table that relates the distances and voltages applied to strength. As another example, the weld module 1116 may determine the strength of the weld bead at the location along the joint based on the distances (of the topography 1112) and the current through the electrode. The weld module 1116 may determine the strength using one of an equation and a lookup table that relates the distances and currents to strength. As another example, the weld module 1116 may determine the strength of the weld bead at the location along the joint based on the distances (of the topography 1112) and the feed rate of the electrode material. The weld module 1116 may determine the strength using one of an equation and a lookup table that relates the distances and feed rates to strength. As another example, the weld module 1116 may determine the strength of the weld bead at the location along the joint based on the distances (of the topography 1112) and the current of the motor of the electrode feeder. The weld module 1116 may determine the strength using one of an equation and a lookup table that relates the distances and currents to strength. As another example, the weld module 1116 may determine the strength of the weld bead at the location along the joint based on the distances (of the topography 1112) and the flow rate of the shield gas. The weld module 1116 may determine the strength using one of an equation and a lookup table that relates the distances and shield gas flow rates to strength. As another example, the weld module 1116 may determine the strength of the weld bead at the location along the joint based on the distances (of the topography 1112) and the position of the weld gun 504. The weld module 1116 may determine the strength using one of an equation and a lookup table that relates the distances and weld gun positions to strength. As another example, the weld module 1116 may determine the strength of the weld bead at the location along the joint based on the distances (of the topography 1112) and the movement speed of the weld gun 504. The weld module 1116 may determine the strength using one of an equation and a lookup table that relates the distances and weld gun speeds to strength. As another example, the weld module 1116 may determine the strength of the weld bead at the location along the joint based on the distances (of the topography 1112) and the bearing of the weld gun 504. The weld module 1116 may determine the strength using one of an equation and a lookup table that relates the distances and weld gun bearings to strength. As another example, the weld module 1116 may determine the strength of the weld bead at the location along the joint based on the distances (of the topography 1112) and the direction of travel of the weld gun 504. The weld module 1116 may determine the strength using one of an equation and a lookup table that relates the distances and weld gun directions to strength. As another example, the weld module 1116 may determine the strength of the weld bead at the location along the joint based on the distances (of the topography 1112) and the sound captured near the weld gun 504. The weld module 1116 may determine the strength using one of an equation and a lookup table that relates the distances and sound (e.g., magnitude(s) at one or more predetermined frequencies) to strength. As another example, the weld module 1116 may determine the strength of the weld bead at the location along the joint based on the distances (of the topography 1112) and one or more features of one or more images captured.

The weld module 1116 may take one or more actions based on one or more of the characteristics. For example, the weld module 1116 may store information regarding one or more of the characteristics (e.g., along with the location) in memory 1120. Additionally or alternatively, the weld module 1116 may selectively activate one or more output devices 1124 to output an alarm based on one or more of the characteristics. For example, the weld module 1116 may turn on a light, output a sound via a speaker, turn on a vibrating device, display an alert on a display, or activate one or more other types of output devices.

Figure 13:
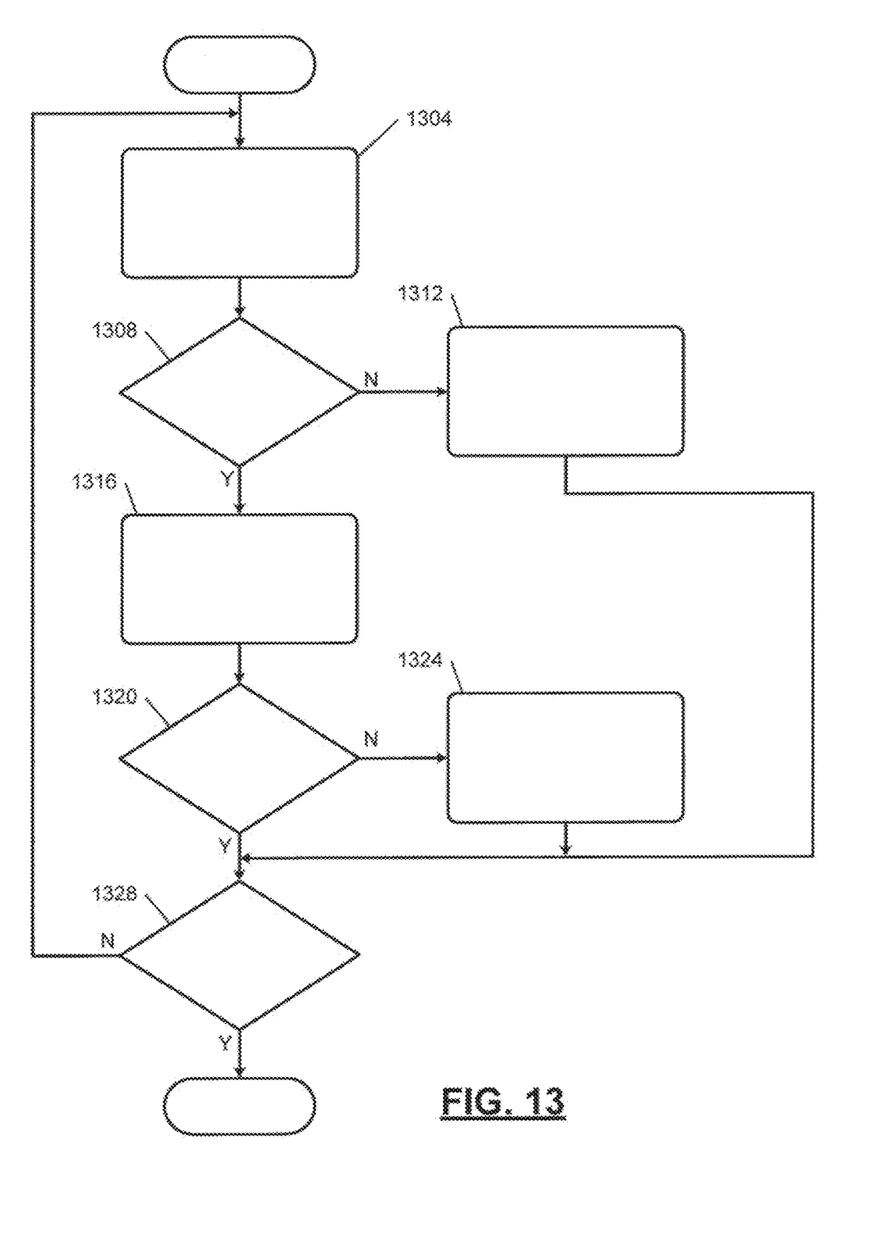
FIG. 13 is a flowchart depicting an example method of monitoring arc welding.

FIG. 13 is a flowchart depicting an example method of monitoring arc welding. Control begins when arc welding of workpieces begins. At 1304, the weld module 1116 obtains the present parameters of the welding. For example, the weld module 1116 obtains the topography 1112, the measurements from the sensors 554, the present welding parameters, and the present robot parameters. The weld module 1116 also determines a present heat input at 1304. The weld module 1116 may determine the present heat input, for example, based on the present voltage applied and the present current through the electrode. The weld module 1116 may determine the present heat input, for example, using one of an equation and/or a lookup table that relates voltages and currents to heat input.

At 1308, the weld module 1116 determines whether the present heat input is within a predetermined range. The predetermined range may be fixed or variable. The predetermined range may be calibratable and may be, for example, set to +/−a predetermined value of an average of the present heat inputs over a predetermined period. The predetermined value may be, for example, 3Σ of the average of the present heat inputs. If 1308 is false, the weld module 1116 generates an output at 1312, and control may continue with 1328, which is discussed further below. For example, the weld module 1116 may store an indicator of insufficient heat input and the present location in the memory 1120 and/or activate one or more of the output devices 1124. If 1308 is true, control continues with 1316.

At 1316, the weld module 1116 determines the characteristics of the weld bead at the present location based on the topography 1112 and at least one of the other present parameters. For example, the weld module 1116 may determine the characteristics based on the topography 1112 and at least one of: (a) at least one of the measurements from the sensors 554; (b) at least one of the present welding parameters; and (c) at least one of the present robot parameters. Examples of the characteristics include at least one of: whether a defect in the weld bead is present at the location, a length of a detect in the weld bead, a strength of the weld bead at the location, a porosity of the weld bead at the location, whether a cut through occurred at the location, whether the workpieces to be welded are joined at the location, whether the weld bead at the location includes insufficient weld material from the electrode, and whether the weld bead at the location includes excess weld material from the electrode.

At 1320, the weld module 1116 determines whether the strength of the weld at the present location is within a predetermined range. The predetermined range may be fixed or variable. The predetermined range may be calibratable and may be, for example, set to +/−a predetermined value of a predetermined target strength. The predetermined value may be, for example, 3Σ of an average strength over a predetermined period. If 1320 is false, the weld module 1116 generates an output at 1324, and control may continue with 1328, which is discussed further below. For example, the weld module 1116 may store an indicator of the characteristics and the present location in the memory 1120 and/or activate one or more of the output devices 1124. If 1320 is true, control continues with 1328.

At 1328, the weld module 1116 may determine whether the welding (or analysis of the weld bead) is complete. For example, the weld module 1116 may determine whether a predetermined welding period has passed since the welding began. If 1328 is true, control may end. If 1328 is false, control may return to 1304 to obtain the present parameters for a next location.

While the example of arc welding is described above, the above is also applicable to other types of welding, such as fusion welding and solid-state welding (e.g., laser welding, plasma welding, resistance welding, friction stir welding, etc.).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, Wolfram Language and Python®, and associated libraries.

What is claimed is:

1. A weld system comprising:
a robot control module configured to actuate a robot and move a welder along a joint of metal workpieces during welding, the welder being attached to the robot;
a weld control module configured to, during the welding, apply power to the welder, supply a shield gas to the welder, and supply electrode material to the welder;
a vision sensor configured to, during the welding, optically measure N distances between the vision sensor and N locations, respectively, on an outer surface of a weld bead created along the joint by the welder, wherein N is an integer greater than two; and
a weld module configured to:
determine a strength of the weld bead at a location along the joint based on:
the N distances at the location along the joint, wherein the N locations are perpendicular to the joint; and
at least one parameter from at least one of (a) the robot control module during the welding, (b) the weld control module during the welding, and (c) a sensor configured to capture data of the welding during the welding; and
store the strength of the weld and the location in memory.

2. The weld system of claim 1 wherein the weld module is configured to determine the strength of the weld bead at the location along the joint based on:
the N distances at the location along the joint; and
a voltage applied to the welder during the welding and received from the weld control module.

3. The weld system of claim 1 wherein the weld module is configured to determine the strength of the weld bead at the location along the joint based on:
the N distances at the location along the joint; and
a current through the welder during the welding and received from the weld control module.

4. The weld system of claim 1 wherein the weld module is configured to determine the strength of the weld bead at the location along the joint based on:
- the N distances at the location along the joint; and
- a feed rate of the electrode material to the welder during the welding and received from the weld control module.

5. The weld system of claim 1 wherein the weld module is configured to determine the strength of the weld bead at the location along the joint based on:
- the N distances at the location along the joint; and
- a current of an electric motor configured to feed the electrode material to the welder during the welding and received from the weld control module.

6. The weld system of claim 1 wherein the weld module is configured to determine the strength of the weld bead at the location along the joint based on:
- the N distances at the location along the joint; and
- a flow rate of the shield gas to the welder during the welding and received from the weld control module.

7. The weld system of claim 1 wherein the weld module is configured to determine the strength of the weld bead at the location along the joint based on:
- the N distances at the location along the joint; and
- a position of the welder during the welding and received from the robot control module.

8. The weld system of claim 1 wherein the weld module is configured to determine the strength of the weld bead at the location along the joint based on:
- the N distances at the location along the joint; and
- a bearing of the welder during the welding and received from the robot control module.

9. The weld system of claim 1 wherein the weld module is configured to determine the strength of the weld bead at the location along the joint based on:
- the N distances at the location along the joint; and
- a direction of travel of the welder during the welding and received from the robot control module.

10. The weld system of claim 1 wherein the weld module is configured to determine the strength of the weld bead at the location along the joint based on:
- the N distances at the location along the joint; and
- a speed of movement of the welder during the welding and received from the robot control module.

11. The weld system of claim 1 wherein the weld module is configured to determine the strength of the weld bead at the location along the joint based on:
- the N distances at the location along the joint; and
- sound captured by a microphone during the welding.

12. The weld system of claim 1 wherein the weld module is configured to determine the strength of the weld bead at the location along the joint based on:
- the N distances at the location along the joint; and
- at least one image captured by a camera during the welding.

13. The weld system of claim 1 further comprising the robot.

14. The weld system of claim 1 wherein the vision sensor includes a laser distance sensor.

15. The weld system of claim 1 wherein the vision sensor is attached to follow behind the welder as the welder is moved along the joint during the welding.

16. The weld system of claim 1 wherein the weld module is configured to determine the strength of the weld bead at a location along the joint based on:
- the N distances at the location along the joint; and
- at least two parameters from at least one of (a) the robot control module during the welding, (b) the weld control module during the welding, and (c) the sensor configured to capture data of the welding during the welding.

17. The weld system of claim 1 wherein the weld module is configured to determine at least one other characteristic at the location along the joint based on:
- the N distances at the location along the joint; and
- at least one parameter from at least one of (a) the robot control module during the welding, (b) the weld control module during the welding, and (c) the sensor configured to capture data of the welding during the welding.

18. The weld system of claim 17 wherein the at least one other characteristic includes at least one of:
- a porosity of the weld bead at the location;
- whether weld cut through occurred at the location;
- whether joining occurred at the location;
- whether the weld bead at the location includes insufficient material; and
- whether the weld bead at the location includes excess material.

19. A method comprising:
- by a robot control module, actuating a robot and moving a welder along a joint of metal workpieces during welding, the welder being attached to the robot;
- by a weld control module, during the welding, applying power to the welder, supplying a shield gas to the welder, and supplying electrode material to the welder;
- by a vision sensor, during the welding, optically measuring N distances between the vision sensor and N locations, respectively, on an outer surface of a weld bead created along the joint by the welder,
- wherein N is an integer greater than two;
- determining a strength of the weld bead at a location along the joint based on:
  - the N distances at the location along the joint,
  - wherein the N locations are perpendicular to the joint; and
  - at least one parameter from at least one of (a) the robot control module, (b) a weld control module configured to during the welding, and (c) a sensor configured to capture data of the welding during the welding; and
- storing the strength of the weld and the location in memory.

20. A weld system comprising:
- a robot control module configured to actuate a robot and move a welder along a joint of metal workpieces during welding, the welder being attached to the robot;
- a weld control module configured to, during the welding, apply power to the welder, supply a shield gas to the welder, and supply electrode material to the welder;
- a vision sensor configured to, during the welding, optically measure N distances between the vision sensor and N locations, respectively, on an outer surface of a weld bead created along the joint by the welder,
- wherein N is an integer greater than two; and
- a weld module configured to:
  - determine a strength of the weld bead at a location along the joint based on:
    - the N distances at the N locations along the joint,
    - wherein the N locations are on a line that is perpendicular to the joint; and
    - at least one parameter from at least one of (a) the robot control module during the welding, (b) the weld control module during the welding, and (c) a sensor configured to capture data of the welding during the welding, the at least one parameter including sound captured by a microphone during the welding; and store the strength of the weld and the location in memory.

* * * * *